Nov. 6, 1956  K. J. POWERS  2,769,279
DEBURRING MACHINE
Filed Sept. 27, 1954
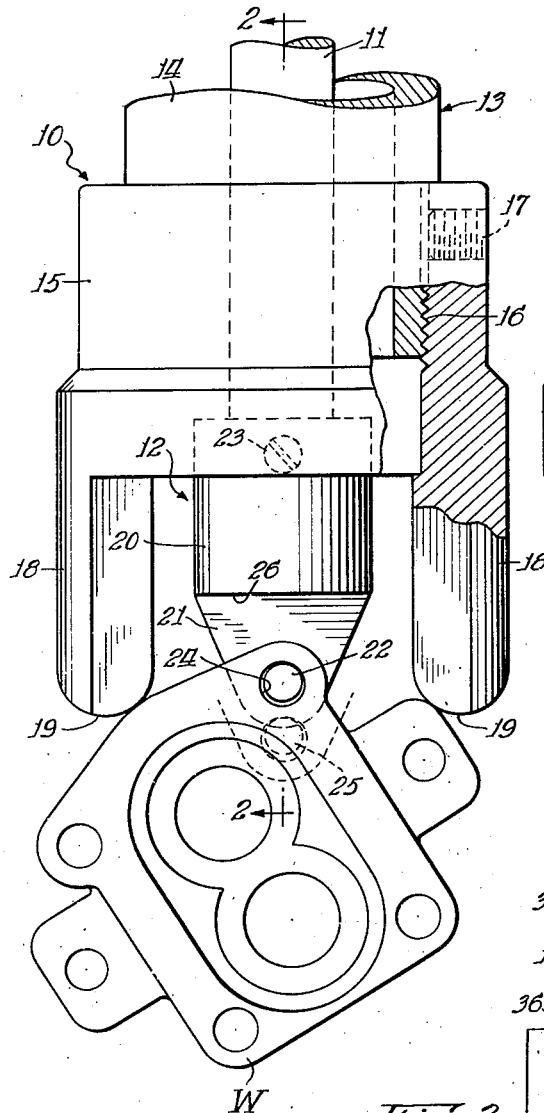
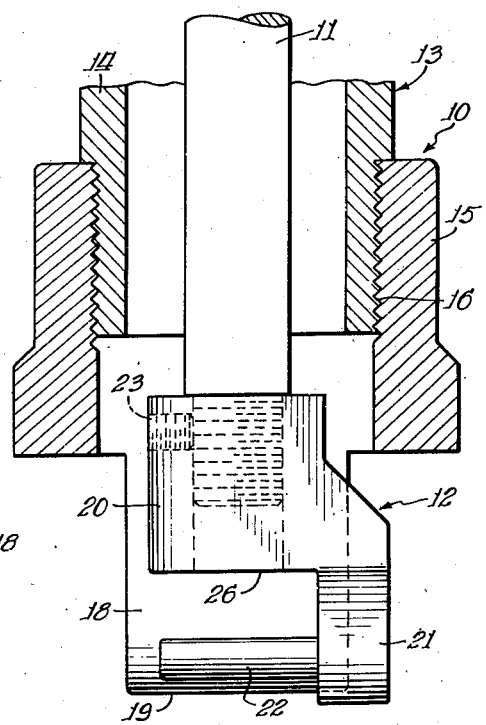
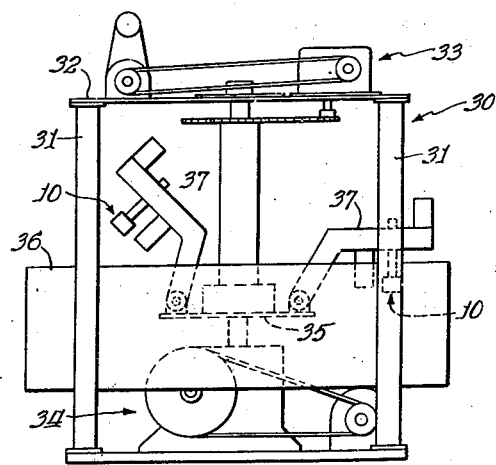
Inventor:
Kenneth J. Powers
By: Joseph R. Dwyer
Atty.

United States Patent Office 2,769,279
Patented Nov. 6, 1956

2,769,279

DEBURRING MACHINE

Kenneth J. Powers, Cleveland, Ohio, assignor to Borg-Warner Corporation, Chicago, Ill., a corporation of Illinois Application September 27, 1954, Serial No. 458,530

4 Claims. (Cl. 51—7)

My invention relates in general to a new and improved fixture or work-holding means and relates in particular to a work-holding means which will firmly hold or locate workpieces or products in a desired position or positions and which will automatically adjust itself to accommodate workpieces or products of irregular contour and/or size.

The expressions "fixture," "work-holder" and "chuck assembly" as used herein must be understood to mean any device or that portion of a device for firmly holding or locating a workpiece, product, material or tool which is being or is to be operated upon in a process of manufacturing.

Heretofore, it has usually been necessary when workpieces of irregular contour and/or size were to be held in a chuck assembly, the chuck assembly had to be disassembled and replaced by another in order to accommodate workpieces of a different contour and/or size. Proposals have been made in an effort to solve the problem of effectively providing a chuck assembly which will automatically accommodate itself to workpieces of different contour and/or size, however, such efforts have not met with success and the assembly herein disclosed as my invention is believed to present a novel and important solution to this problem.

Referring by way of example to the problem encountered in connection with a deburring or tumbling machine in which a workpiece is rotated and submerged in a bath of abrasive material for cleaning or removing burrs therefrom, it has been necessary with known arrangements to remove and replace the chuck assembly or fixture each time a workpiece of different size or contour was to be cleaned or deburred. My invention, however, being particularly adapted for use in connection with a tumbling or deburring machine of this type has solved this problem of continued removing and replacing spindle assemblies by automatically adjusting itself to workpieces of different contours and/or sizes which has resulted in a more efficient operation.

Briefly, my invention comprises essentially a spindle chuck assembly having a reciprocable drawbar having a work-holder head and arranged in a sleeve-like spindle member having prong-like extensions thereon which will draw a workpiece affixed on or to said work-holder head into contact with the prong-like members for holding the workpiece in the desired position to be operated upon while at the same time the entire assembly including the workpiece can be rotated. The spindle assembly through its cooperation with all its elements comprises novel means for automatically adjusting itself to hold workpieces of irregular contour and/or sizes.

Accordingly, it is therefore a principal object of my invention to provide a spindle chuck assembly which will automatically accommodate workpieces of various contours and/or sizes.

Still another object of my invention is to provide a spindle chuck assembly of the present character particularly adapted for use in a tumbling or deburring machine so that the machine can accommodate workpieces of various contour and/or size automatically.

Still another object of my invention is to provide a spindle chuck assembly having a drawbar with a work-holder head attached thereto and arranged in a cylindrical spindle sleeve for reciprocable movement therewith and which will draw through the reciprocating movement of the draw rod a workpiece affixed to the work-holder head into engagement with prong-like extensions on the spindle sleeve; all of which can be rotated as a unit.

Still another and more specific purpose of my invention is the provision of a new and improved spindle chuck assembly particularly useful in a spindle or deburring machine comprising a drawbar having a specially designed work-holder head attached thereto and which is adapted for reciprocating movement for drawing a workpiece into contact with means defining prong-like extensions on a cylindrical spindle, thereby holding or chucking the workpiece all of which can be submerged for rotation in a bath of abrasive material provided for that purpose in a deburring machine.

Additional objects, features and advantages of my invention disclosed herein will be apparent to persons skilled in the art, as the operation and construction thereof are understood from the within description and claims. One embodiment of my invention is illustrated in the accompanying drawings which form a part hereof and wherein:

Figure 1 is a view of a spindle chuck assembly constructed in accordance with the teachings of my invention, and partially broken away to show to advantage the relationship and mode of coaction of the different elements of the assembly;

Figure 2 is a cross-sectional view taken substantially along lines 2—2 of Figure 1; and Figure 3 is a schematic view illustrating my invention in its typical application as installed in a tumbling or deburring machine.

In the exemplary embodiment shown in Figures 1 and 2, the spindle chuck assembly with which my invention is primarily concerned is indicated in its entirety by reference numeral 10 and comprises a draw rod 11 to which is connected a work-holder head means indicated in its entirety as 12, all of which are arranged for reciprocating movement in and with respect to a substantially cylindrical spindle sleeve assembly, indicated in its entirety as 13.

The substantially cylindrical spindle sleeve assembly 13 comprises a cylindrical member 14 having attached thereto a cylindrical terminal sleeve member 15 suitably affixed to the cylindrical member 14 as by threads 16. Additional connecting means 17 may be used, if desired. Terminal sleeve member 15, in the embodiment shown, has a pair of prong-like extensions 18 formed thereon which may be covered by a suitable material, such as neoprene, synthetic or natural rubber for the purpose of preventing injury of a workpiece W as it is brought or drawn into contact with rounded terminal edges 19 of the prong-like member 18. Obviously the terminal member 15 could also be made entirely of one piece of this same synthetic or natural material or other suitable material having sufficient rigidity to assist in holding a workpiece in position yet preventing injury to the workpiece when held in such a position.

The work-holder head means 12 comprises a partially cylindrical member 20 having a downwardly extending flange 21, as shown in Figures 1 and 2, to which is affixed in any suitable and convenient manner, a pin member 22 substantially at right angles thereto for the purpose more fully described hereinafter. The member 20 is attached to rod 11 in any convenient manner such as by a screw 23.

Thus from the above description, it is to be noted that the workpiece W, being of irregular contour as shown in Figure 1 having an aperture or through hole 24 can be held in place through coaction of the various elements of the spindle chuck assembly. Apertures in workpieces, such as aperture 24 in the workpiece W, are usually already preformed in such products for purposes other than for holding the same in my invention, however, if necessary, provision of such an aperture in products where an aperture would not ordinarily be formed has been found to be not too inconvenient. For example, the workpiece W, shown in Figure 1, is an end plate of a pump housing which is ultimately attached to the remainder of the housing by bolts through pre-formed apertures, such as 24, to form a complete pump, and the spindle chuck assembly herein disclosed conveniently utilized these holes for holding the end plate for a further operation, as in this case, for cleaning the same and removing burrs and other undesirable material. Thus, when the drawbar 11 is moved downward as shown in Figure 1 the pin 22 is lowered to a position, such as 25 and, in this position, the workpiece W can be inserted in the spindle chuck assembly 10 by merely bringing the workpiece to a position where the pin member 22 is inserted through the pre-formed aperture 24. Upon return upward movement of the drawbar 11 the workpiece is brought into contact with the terminal edges 19, thus triangulating the workpiece, as it were, between the diametrically opposite contact points on the terminal edge 19 and the pin member 22. The workpiece W is then firmly held in place by the coaction of all the members of my assembly and can be rotated or moved as a unit as long as desired for any purpose or operation desired. Workpiece W can be released after completion of the operation or step in the process of manufacture by downward movement of drawbar 11 to position 25. It is notable that workpieces of various contours and/or sizes can be held in a position in the manner workpiece W is held in position as shown in Figure 1, said contours and/or sizes being limited only by the distance the pin member 22 is from a limiting means such as face 26 of member 20. Obviously, too, pin member 22 can be lowered much further than position 25, as shown in Figure 1 to insert a workpiece having apertures located radially further inward of the outer edges of the workpiece than aperture 24 is from the outer edge of workpiece W. In other words, my invention can hold workpieces of contours and/or sizes different from that shown and having a through hole or aperture in a different location from that shown without further adjustment by the simple expediency of lowering the drawbar 11 to a position where the pin member 22 can be inserted in the through hole therein and returning the drawbar until the outer edge of the workpiece rests against the terminal edges 19.

Referring now to Figure 3 of the drawings there is shown a schematic view of a tumbling or deburring machine, indicated in its entirety by reference numeral 30, in which my invention has been illustrated as having particular applicability. The tumbling machine comprises generally a structure having posts 31 which support a platform 32 on which is mounted a motor drive-reduction gear transmission assembly, indicated in its entirety by reference numerals 33 and 34, which drives a large horizontal carriage 35 and slowly rotates trough 36 about their vertical axes. Hinged to the carriage 35 are a plurality of radially extending spindle units 37 which horizontally rotates therewith. These spindle units 37 are usually individually pneumatically powered and can swing upwards and downwards with respect to the carriage 35 for the purpose of raising and lowering workpieces into the slowly rotating trough 36 containing a liquid mass of abrasive material provided for that purpose. A spindle chuck assembly 10, constructed in accordance with my invention, is attached to and thus forms part of each of the spindle units 37. The spindle unit provides the necessary motivation for reciprocating the drawbar 11 and spinning the entire spindle assembly including the workpiece as a unit. Thus, when the spindle unit 37 having my invention attached thereto, is in a raised position, the spinning movement ceases and the drawbar thereof is moved to a position such as that identified as 25 in Figure 1 and a workpiece W is inserted on pin member 22. The drawbar 11 is then returned to its original position chucking or holding the workpiece W securely upon the spindle unit 37 that is in a position such as that disclosed in Figure 1. Shortly thereafter, the spindle unit 37 is lowered spinning into the mass of abrasive material in the trough 36 for cleaning and deburring the workpiece. Upon completion of the cleaning and deburring operation, usually one cycle of rotation of carriage 35, the workpiece W is returned to its original position, the spinning stops, and the drawbar is returned to position 25 so that an operator can remove the cleaned workpiece from the spindle assembly. It is obvious that with a spindle chuck assembly constructed in accordance with the teachings of my invention, workpieces of various contours and/or sizes can be automatically accommodated in a machine such as that herein described thus making it unnecessary for an operator to disassemble and replace a chuck assembly to accommodate different contours and/or sizes of workpieces.

While my invention has been disclosed as having particular applicability in connection with a tumbling or deburring machine, it will be understood that this is by way of example and that my invention can be applied wherever an equivalent problem exists.

I claim:

1. A deburring machine having a carriage rotatably mounted about a vertical axis with a plurality of spindle units hingedly attached thereto for raising and lowering a work piece while spinning into and out of a liquid mass of abrasive material, a spindle chuck assembly for each spindle unit including a substantially cylindrical spindle sleeve means, a draw bar received in said spindle sleeve means and actuated by said spindle unit, and a work holder head means adapted to receive a work piece when said draw bar is in one position and to chuck said work piece by cooperation between said spindle sleeve means and said work holder head means when said draw bar is in a second postion.

2. A deburring machine having a carriage rotatably mounted about a vertical axis with a plurality of spindle units hingedly attached thereto for raising and lowering a work piece while spinning into and out of a liquid mass of abrasive material, a spindle chuck assembly for each spindle unit comprising a work holder head means including a pin member adapted to cooperate with a preformed hole in said work piece, a substantially cylindrical spindle sleeve, said work holder head means being arranged to reciprocate from a loading position to a chucking position with respect to means including one end of said spindle sleeve, said work holder head means being motivated by said spindle unit, and said pin member and said one end of said spindle sleeve holding said work piece in fixed operative position when said work holder head means is in said chucking position.

3. A deburring machine having a carriage rotatably mounted about a vertical axis with a plurality of spindle units hingedly attached thereto for raising and lowering a work piece while spinning into and out of a liquid mass of abrasive material, a spindle chuck assembly for each spindle unit comprising a work holder head means including a pin member adapted to cooperate with a preformed hole in said work piece, a substantially cylindrical spindle sleeve including a resilient plastic-like material to prevent injury to the work piece, said work holder head means being arranged to reciprocate from a loading position to a chucking position with respect to one end of said spindle sleeve, said work holder head means being motivated by said spindle unit, and said pin member and means including one end of said spindle sleeve holding said work piece in fixed operative position when said work holder head means is in said chucking position.

4. A deburring machine as claimed in claim 3 wherein said means including one end of said spindle sleeve comprises a pair of prong-like extensions.

References Cited in the file of this patent

UNITED STATES PATENTS

| | | |
|---|---|---|
| 1,445,875 | Ellingham | Feb. 20, 1923 |
| 1,724,435 | Studwell | Aug. 13, 1929 |
| 1,756,773 | Wendt | Apr. 29, 1930 |
| 2,218,353 | Gruenberg | Oct. 15, 1940 |
| 2,236,781 | Pannier | Apr. 1, 1941 |
| 2,466,585 | Dupertius | Apr. 5, 1949 |
| 2,720,410 | Smith | Oct. 11, 1955 |